United States Patent [19]

Cheng et al.

[11] 4,247,530
[45] Jan. 27, 1981

[54] APPARATUS AND METHOD FOR PRODUCING CARBON BLACK

[75] Inventors: Paul J. Cheng; King L. Mills, both of Bartlesville, Okla.

[73] Assignee: Phillips Petroleum Company, Bartlesville, Okla.

[21] Appl. No.: 897,883

[22] Filed: Apr. 19, 1978

[51] Int. Cl.³ .......................... C01B 31/02; C09C 1/48
[52] U.S. Cl. ..................................... 423/450; 423/449; 422/150
[58] Field of Search ............... 423/449, 450, 455, 456; 422/150

[56] References Cited

U.S. PATENT DOCUMENTS

| | | | |
|---|---|---|---|
| 2,563,085 | 8/1951 | Utsinger | 134/2 |
| 2,577,254 | 12/1951 | Lawson | 134/2 |
| 2,809,098 | 10/1957 | Larson | 423/456 |
| 3,310,379 | 3/1967 | Hinson et al. | 423/450 |
| 3,333,928 | 8/1967 | Kobayashi | 23/209.6 |
| 3,369,870 | 2/1968 | Ganz et al. | 423/450 |
| 3,438,732 | 4/1969 | Morel | 423/450 |
| 3,734,999 | 5/1973 | Dollinger | 423/450 |

Primary Examiner—O. R. Vertiz
Assistant Examiner—Gregory A. Heller

[57] ABSTRACT

Combustion gases containing free oxygen and feed hydrocarbon are introduced into a carbon black reactor, with the combustion gases being at a temperature sufficient to pyrolyze the feed hydrocarbon to produce particulate carbon black. The combustion products are cooled by quenching to form a gaseous effluent containing particulate carbon black. The quenched effluent is discharged from the reactor to an indirect heat exchange means for further cooling the effluent. Control means is provided for producing a signal representative of the rate of heat transfer in the indirect heat exchange means. When the heat transfer rate falls below a predetermined level, the control means closes a valve in the feed hydrocarbon input line to terminate flow of the feed hydrocarbon to the reactor. In the absence of feed hydrocarbon, hot combustion gases flowing through the reactor and the indirect heat exchange means contain sufficient free oxygen to burn out carbon black deposits in the indirect heat exchange means. When the heat transfer rate once again reaches a predetermined level, the control means restarts the flow of feed hydrocarbon into the reactor. The effluent, after cooling in the indirect heat exchange means, is passed to means for separating the effluent into a gas portion and a particulate carbon black portion.

10 Claims, 1 Drawing Figure

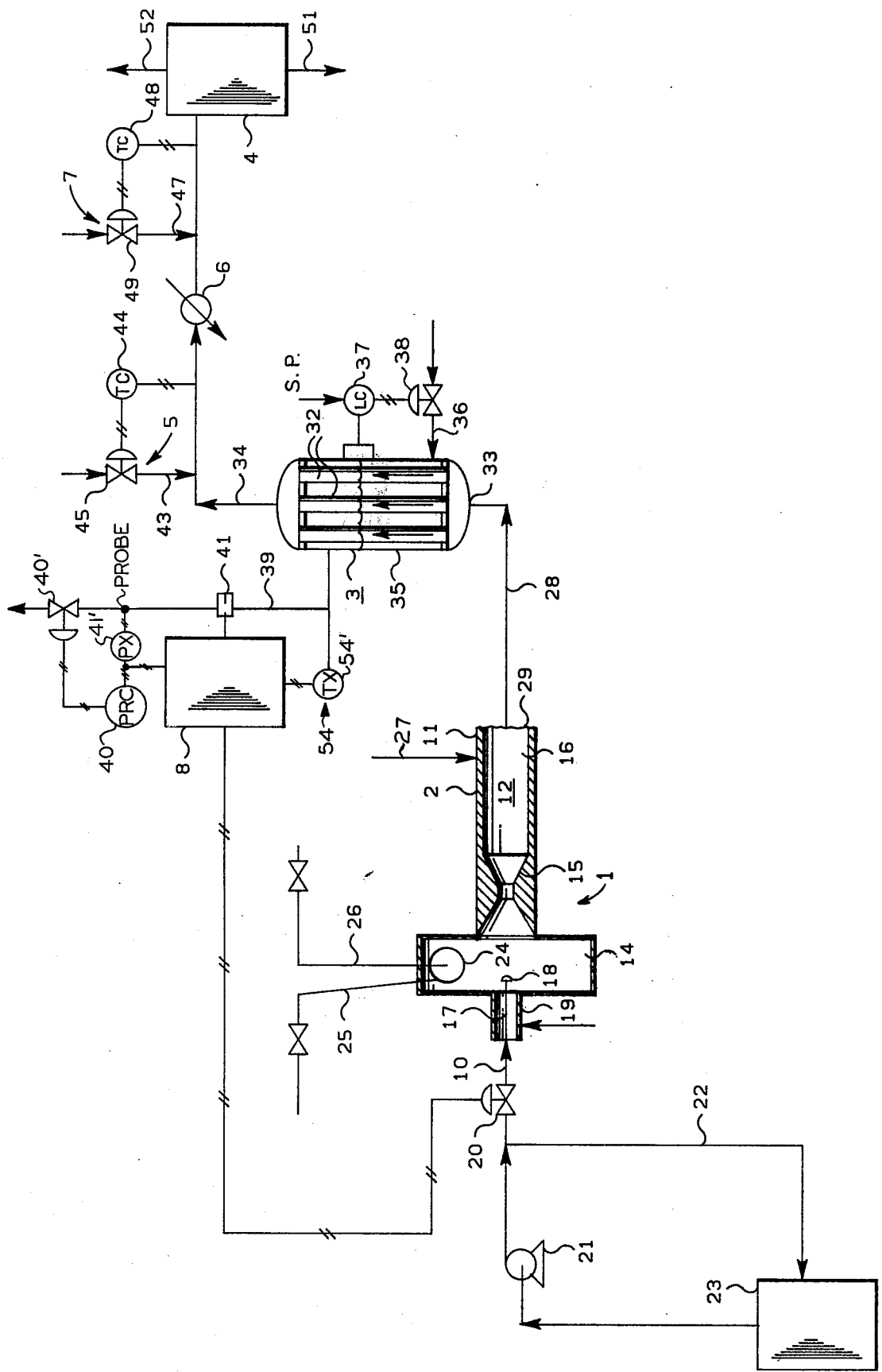

APPARATUS AND METHOD FOR PRODUCING CARBON BLACK

The present invention relates to a method and apparatus for producing carbon black by the pyrolysis of feed hydrocarbon feed.

In a typical furnace black process, feed hydrocarbon is introduced into a reactor and contacted with hot combustion gases which elevate the temperature of the feed hydrocarbon to a temperature sufficiently high to decompose the feed hydrocarbon to particulate carbon black and form combustion products. Such combustion products are typically at a temperature in the range of about 2400° F. to about 2900° F. The combustion products are cooled to form an effluent (sometimes referred to as smoke) containing particulate carbon black. In order to complete the manufacturing process, the effluent is separated into a gas phase and a particulate carbon black phase by separating means such as a cyclone separator, bag filters or the like. However, before the filtering or separation step the effluent should be cooled to a temperature sufficiently low to prevent damage to the separating means. A plurality of cooling steps is normally employed.

It is common practice to initially cool or quench the combustion products by injecting directly thereinto quench fluid at one or more points in a quench chamber portion of the reactor. Typical quench fluids include water, cooled effluent or smoke, and/or off-gas, off-gas being a portion of the gas phase separated from the effluent. Such a first cooling step normally lowers the temperature of the combustion products to a temperature of about 2000° F. or less, preferably between about 1500° F. and 2000° F. The first cooling is done to lower the temperature of the combustion products to a temperature which can be safely accommodated in an indirect heat exchange means.

A second step of cooling involves the use of a first indirect heat exchange means, such as a shell-tube heat exchanger, which further lowers the temperature of the effluent to a temperature of about 1200° or less, and preferably between about 800° F. and about 1200° F. The thus cooled effluent can then be passed to one or more economizers, e.g., indirect heat exchangers which are operable for heating air and/or feed hydrocarbon to be introduced into the reactor. The first indirect heat exchange means commonly uses water at elevated pressure and temperature as the heat sink heat exchange medium. A final cooling of the effluent is normally accomplished before the effluent enters separating means. It is common practice in the art to finally cool the effluent by injecting a trim quench fluid into the effluent. The final cooling lowers the temperature of the effluent to a temperature which can be safely accommodated by the separating means. Typically this temperature would be below about 600° F. for bag filters. However, this temperature is dependent upon the type of bag filters used or the type of separating means used.

However, one problem attendent with the use of such apparatus is that carbon black deposits tend to build up in the first indirect heat exchanger. Since carbon black is a good insulator, a thin layer of the carbon black will substantially lower the heat transfer rate in the indirect heat exchanger. It is therefore necessary to clean the indirect heat exchanger from time to time in order to maintain a high heat transfer rate and adequate operating efficiency. One method of accomplishing the cleaning is shutting down the reactor and allowing the indirect heat exchanger to cool to a temperature at which the indirect heat exchanger can be partially disassembled for cleaning by methods well known in the art to remove the carbon black deposits. However, such a cleaning method is wasteful from several aspects. The total apparatus must be shut down to effect the cleaning, and the indirect heat exchanger must be partially disassembled for cleaning. After the cleaning operation, the apparatus is placed back in operation and allowed a period of operating time, which can be several hours, to stabilize before the production of carbon black is commenced. Such a method is wasteful of man hours, combustible fuel, and production time.

The present invention provides a method of producing carbon black which allows for cleaning of the indirect heat exchanger without the aforementioned problems. This is accomplished by intervallically terminating or substantially terminating flow of feed hydrocarbon to the reactor either manually or automatically when the heat transfer rate in the indirect heat exchanger falls below a predetermined level. The combustion gases are still introduced into the reactor with excess free oxygen in a quantity sufficient to burn the carbon black deposits in the indirect heat exchanger. When the heat transfer rate in the indirect heat exchanger once again attains a sufficiently high level, the introduction of feed hydrocarbon can be commenced either manually or automatically. By such a method, the heat exchanger need not be disassembled nor is a long period of operation of the reactor required for stabilization before carbon black can be produced once again. Cleaning by such a method can be accomplished in about ten minutes as opposed to several days by the shutdown and disassemble method. The cleaning operation in accordance with the invention can be conducted for a suitable length of time at suitable intervals, for example, for about ten minutes every four to eight hours.

It is an object of this invention to provide a method of producing carbon black which can be operated substantially continuously without need of completely terminating operation for cleaning of an indirect heat exchanger to maintain the heat exchange rate in a desired range. It is a further object of the present invention to provide an apparatus to accomplish such a method. It is a still further object of this invention to provide an apparatus with control means which will automatically control operation of the apparatus in a manner to minimize carbon black buildup in an indirect heat exchanger.

Other objects and advantages of the present invention will become apparent from the following detailed description taken in connection with the accompanying drawings wherein are set forth by way of illustration and example certain embodiments of this invention.

FIG. 1 is a schematic illustration of a carbon black producing apparatus.

The reference numeral 1 designates generally a carbon black producing apparatus. The apparatus 1 includes a reactor 2 which is operable for pyrolyzing feed hydrocarbon to particulate carbon black. An indirect heat exchange means 3 is connected in flow communication with the outlet of the reactor 2 and is operable for cooling effluent discharged from the reactor 2. The effluent is discharged from the heat exchanger 3 to separating means 4 which is operable for separating the effluent into a gas phase or portion and a carbon black phase or portion. Flowwise between the heat exchanger 3 and the separating means 4, there is provided one or more additional heat exchange means 5, 6 and 7 operable for further cooling the effluent before the effluent enters the separator 4. Control means 8 is operably associated with the heat exchanger 3 for providing a signal representative of the heat transfer rate therein. This signal is used for controlling the input of feed hydrocarbon via an inlet means 10 into the reactor 2.

In the illustrated structure, the reactor 2 includes a housing 11 which defines a chamber 12 therein. The chamber 12 includes a combustion compartment or zone 14, a reaction compartment or zone 15 in flow communication with the combustion compartment 14 and downstream thereof and a quench compartment or zone 16 in flow communication with and downstream of the reaction compartment 15. The reaction compartment 15 can assume the shape of a venturi. The feed hydrocarbon inlet means 10 opens into the chamber 12 and is operable for introducing feed hydrocarbon thereinto. As shown, the inlet means 10 includes an inlet 17 having a nozzle 18 on the end thereof for spraying the feed hydrocarbon preferably into either the combustion compartment 14 or reaction compartment 15. A second conduit 19 can be provided to surround the conduit 17 for introducing generally axially directed air into the combustion compartment 14 for cooling the feed hydrocarbon inlet means 17 and nozzle 18. A flow control valve 20, preferably of the on/off type, is connected in the conduit 17 and is operable for selectively terminating or substantially terminating the flow of feed hydrocarbon into the chamber 12. Feed hydrocarbon is supplied from a source 23 and is pressurized, for example, by a pump 21. A return line 22 can be connected to the conduit 17 for return of feed hydrocarbon during the time the valve 20 is closed such that the feed hydrocarbon will flow back to the source 23.

Inlet means 24 preferably opens into the combustion compartment 14 and is operable for introducing combustion gases into the combustion compartment 14. The combustion gases can be a burning mixture of a combustible fuel and free oxygen-containing gas or can be a mixture of a combustible fuel and free oxygen-containing gas for burning within the combustion compartment 14. Fuel is supplied to the inlet means 24 via a line 25 and free oxygen-containing gas, for example air, is supplied via a line 26. Preferably the inlet means 24 is directed tangentially relative to the combustion compartment 14 to effect vortex flow of the combustion gases along the chamber 12.

Quench inlet means 27 opens into the quench compartment 16 and is operable for introducing a quench fluid such as water or cooled smoke into the combustion products for cooling the combustion products and forming a quenched effluent. The inlet means 27 can be directed generally radially or tangentially and if tangentially directed, it can be directed in a direction for counterrotational or corotational flow of quench fluid relative to the vortex flow of effluent. Preferably, the quench of the combustion products in the quench compartment 16 produces effluent having a temperature in the range of about 1500° F. to about 2000° F.

A conduit means 28 connects a discharge 29 of the reactor 2 to the heat exchanger 3. The heat exchanger 3 can be of any suitable indirect heat exchange type such as a shell/tube type similar to that disclosed in U.S. Pat. No. 3,369,870. The effluent discharged from the reactor 2 via the conduit 28 flows through the tubes 32 from an inlet 33 to an outlet 34. Surrounding the tubes 32 is the shell 35 into which a suitable heat exchange medium is introduced via an inlet conduit 36. The heat exchange medium introduced via the inlet conduit 36 is the heat sink medium while the effluent flowing through the tubes 32 is the heat source medium. A liquid level control means 37 can be associated with the shell 35 for sensing the level of heat exchange medium therein. The level controller 37 is connected to a valve 38 located in the inlet conduit 36 to control the input of heat sink medium, which preferably is preheated water under pressure, and thereby the level of liquid in the shell 35. A shell outlet conduit 39 is provided for the discharge of heated heat sink medium which preferably is in the form of steam. There is connected in the outlet conduit 39 a pressure regulator controller means 40 which is operable for controlling the pressure in the shell by manipulation of the valve 40'. There is also operably connected in the conduit 39 a temperature sensor portion of a temperature measuring and transmitting means 54 operable for measuring the temperature of the discharged heat sink medium. Signals representing the pressure, temperature and flow rate of the discharged heat sink medium are transmitted to the control means 8. By controlling the discharge pressure, and knowing the temperature, as measured by the means 54, the heat transfer rate in the heat exchanger 3 can be readily determined if the heat sink medium is known and the discharge rate of the heated heat sink liquid, now vapor, is also known.

The control means 8 is operable for producing a signal representative of the heat transfer rate in the heat exchanger 3. One advantageous way of accomplishing this is by having an orifice flow meter 41 connected in the discharge conduit 39 wherein a differential pressure signal measurement is provided which signal is acted on by a square root device taking the square root of the signal to provide a signal representative of the flow rate of the discharged steam. A pressure probe is connected in the discharge conduit 39 and is operably connected to a pressure transmitter 41' and is operable for measuring the pressure in the conduit 39. The pressure transmitter 41' transmits a signal representative of the line pressure to a pressure controller 40 which is operably connected to a control valve 40' connected in the conduit 39. The controller 40 manipulates the valve 40' to control the line pressure in accordance with a set point signal in the controller 40. The pressure signal from the transmitter 41' is also transmitted to the control means 8. The means 54 includes a temperature probe connected in the conduit 39 and is operable for sensing the temperature of the steam in the conduit 39. A temperature transmitter 54' is connected to the temperature probe and is operable for providing a signal representative of the steam temperature in the conduit 39. This temperature signal is transmitted to the control means 8. The control means 8 can be of any suitable type as is known in the art as, for example, a high/low controller such as Model 401 Optrol (R)/A Analog Process Control System manufactured by Applied Automation, Inc., Bartlesville, Oklahoma. The functional relationship of heat content of the steam and its properties such as pressure and temperature can be programmed into the control means 8 whereby when the temperature signal and pressure signal are received by the control means 8 from the pressure transmitter 41' and the temperature transmitter 54', respectively, the control means 8 can produce a signal representative of the heat content of the steam.

By knowing the flow rate of the steam via the orifice flow meter 41, the control means 8 will multiply the flow rate signal by the heat content signal and produce a signal representative of the heat transfer rate in the heat exchanger 3. This is based on a constant heat input into the heat exchanger 3 via the super heated water introduced through the inlet 36. If this heat input is not constant, then control means such as that disclosed above can provide a signal of the heat input to the heat exchanger whereby the heat input to the heat exchanger can be subtracted from the heat output from the heat exchanger 3 to provide a differential heat signal which is representative of the absolute heat transfer rate.

When the heat transfer rate falls below a predetermined level, the valve 20 will be manipulated by the control means 8 to substantially terminate or terminate introduction of feed hydrocarbon into the reactor 2. The closing and opening of the valve 20 is manipulated by the control means 8 in response to the heat transfer rate signal. The combustion gases will flow to the heat exchanger 3 with an excess of free oxygen as, for example, as applied through the inlet 26 for burning off or oxidizing the carbon black deposits collected in the tubes 32. When the heat transfer rate is increased to a predetermined level, because of the carbon black deposit reduction, the control means 8 will open the valve 20 thereby allowing feed hydrocarbon to once again be introduced into the reactor 2 for the production of carbon black. The control of the process can be advantageously accomplished in the manner above because heat transfer rate is directly proportional to the heat content per unit time of the steam flowing through the discharge 39.

The feed hydrocarbon introduction is terminated when the heat transfer rate falls below a predetermined value, for example, in the range of about 40 to about 80 percent of the maximum heat transfer rate within the heat exchanger 3 for a given heat input of effluent into the heat exchanger 3. The maximum heat transfer rate is the rate at which it is desired to operate the heat exchanger 3 to achieve a desired temperature reduction of the effluent for a given input of effluent into the heat exchanger 3. Also, the feed hydrocarbon introduction can be started when the heat transfer rate once again reaches a higher predetermined value, for example, in the range of about 85 to about 100 percent of the maximum heat transfer rate described above. In one embodiment, the feed hydrocarbon is terminated when the heat transfer rate falls below about 70 percent of the maximum heat transfer rate and is once again restarted when the heat transfer rate attains at least about 90 percent of the maximum heat transfer rate.

The above-described method of providing a signal representative of the heat transfer rate is preferred, however, other methods can be also employed. For instance, with the reactor 2 operating at steady-state condition, i.e., a given quantity of effluent at a given temperature being introduced into the heat exchanger 3, the change or differential in temperature of the effluent between the inlet and the outlet of the heat exchanger 3 can be measured and transmitted to a temperature controller (not shown) to generate a control signal which can in turn be transmitted to the valve 20 via the control means 8 to intervallically turn the valve 20 on and off in response to the difference between a differential setpoint temperature and the measured differential temperature. Also, under steady-state operating conditions the effluent entering the heat exchanger 3 will be substantially at a constant flow rate, pressure and temperature and therefore it would only be necessary to measure the temperature of the effluent exiting the heat exchanger 3 to provide a signal representative of the heat transfer rate. For a maximum heat transfer rate under a given set of operating conditions a known temperature drop between the inlet and outlet of the heat exchanger will be realized and if the heat transfer rate decreases then the outlet temperature of the effluent will increase thereby indicating a decrease in the heat transfer rate. In such a system it is desired that the temperature of the effluent exiting the heat exchanger be about 1200° F. When the temperature rises to a predetermined level say, for example, 1600° F. and preferably 1400° F. as measured by a temperature probe (not shown) connected to a temperature controller (not shown) the controller provides a control signal which can be used as a signal representing a decrease in heat transfer rate which control signal can be used to manipulate the operation of the valve 20 in response to the difference between a desired setpoint temperature and the measured temperature. The control means 8 as described above can be used in connection with the temperature controller (not shown) connected to the temperature probe in the inlet and outlet 33 and 34, respectively, of the heat exchanger 3.

The heat exchanger means 5 in the illustrated structure includes a quench inlet 43 opening into the conduit 34 and is operable for introducing a quench fluid such as water into the conduit 34 if the effluent flowing through the conduit 34 is above a predetermined temperature. A temperature control means 44 is operable for receiving a temperature measurement of the effluent temperature in the conduit downstream from the inlet 43 and for regulating valve 45 to control the input rate of the quench fluid via the inlet 43 in response to the difference between a desired setpoint temperature and said measured temperature. The control of such temperature can prevent damage to the heat exchanger 6.

The heat exchanger 6 can be of any suitable type and is preferably an indirect heat exchanger and, for example, is operable for heating air which is introduced into the combustion chamber 14 via the conduit 26. A similar heat exchanger (not shown) can also be connected in the conduit 34 and operable for heating the feed hydrocarbon introduced via the conduit 17.

Another heat exchanger 7 can be connected in the conduit 34 immediately upsteam of the separator means 4. The heat exchanger 7, as illustrated, includes an inlet 47 opening into the conduit 34 and is operable for introducing a quench fluid such as water thereinto. A temperature controller 48 is operably connected to the conduit 34 via a temperature sensor and is operable for measuring the temperature of the effluent flowing therethrough by use of the temperature sensor positioned downstream from the inlet 47. The temperature controller 48 is operable for manipulating a flow control valve 49. The flow control valve 49 controls the input rate of quench fluid introduced via the inlet 47 in response to an output or control signal which is the difference between a desired setpoint temperature and the measured temperature. Preferably, the temperature of the effluent entering the separator means 4 is below about 750° F. and more preferably below about 600° F., depending upon the separator means used.

The separator means 4 can be of any suitable type as described and can be a bag filter or a cyclone separator or the like. The separator means 4 is operable for separating the effluent into a carbon black phase or portion which is discharged via an outlet 51 while the separated gas portion or phase, usually referred to as off-gas, is discharged via an outlet 52.

It is to be understood that while there have been illustrated and described certain forms of the present invention, it is not to be limited to the specific form or arrangement of parts herein described and shown or to the specific series of steps except to the extent that such limitations are found in the claims.

What is claimed and desired to be secured by Letters Patent is:

1. A method of producing carbon black:
   introducing feed hydrocarbon into a reaction zone;
   introducing hot combustion gases into said reaction zone and heating said feed hydrocarbon to a carbon black producing temperature thereby producing combustion products containing particulate carbon black;
   firstly cooling said combustion products to lower the temperature of the combustion products below a carbon black producing temperature to produce effluent;
   secondly cooling the thus produced effluent in an indirect heat exchange means;
   producing a signal representative of the rate of heat transfer from the effluent in the indirect heat exchange means;
   intervallicaly substantially terminating introduction of feed hydrocarbon into the reaction zone in response to said signal reaching a predetermined level indicating a relative low level of heat transfer rate in the indirect heat exchange means;
   removing carbon black deposits in said heat exchange means during the termination by contact of the deposits with the hot combustion gases from the reaction zone and free oxygen; and
   separating the effluent into a gas portion and a carbon black portion after the second cooling.

2. A method as set forth in claim 1 including:
   thirdly cooling the effluent after the second cooling and before the separating of the effluent into the gas portion and the carbon black portion.

3. A method as set forth in claim 2 wherein:
   water is used as a heat sink medium in the indirect heat exchange means.

4. A method as set forth in claim 3 wherein:
   said water is heated sufficiently to form steam which is discharged from the indirect heat exchange means; and
   said signal is representative of the quantity of steam per unit time discharged from the indirect heat exchange means.

5. A method as set forth in claim 2 wherein:
   said first cooling is substantially effected by injecting first quench fluid into said combustion products.

6. A method as set forth in claim 5 wherein:
   said third cooling is substantially effected by injecting second quench fluid into said effluent.

7. A method as set forth in claim 2 wherein:
   said combustion gases are cooled to a temperature below about 2000° F. during termination of introduction of feed hydrocarbon before said combustion gases contact the deposits.

8. A method as set forth in claim 7 wherein:
   said first cooling lowers the temperature of the combustion products to below about 2000° F. and said third cooling further lowers the temperature of the effluent to below about 750° F.

9. A method as set forth in claim 2 wherein:
   said feed hydrocarbon introduction is substantially terminated when the heat transfer rate is less than about 80 percent of a maximum heat transfer rate and said feed hydrocarbon introduction is restarted when said heat transfer rate is between about 85 percent and 100 percent of a maximum heat transfer rate.

10. A method as set forth in claim 2 wherein:
    said feed hydrocarbon introduction is substantially terminated when the heat transfer rate is less than about 70 percent of a maximum heat transfer rate and said feed hydrocarbon introduction is restarted when said heat transfer rate is above about 90 percent of a maximum heat transfer rate.

* * * * *